(12) United States Patent
Walters et al.

(10) Patent No.: US 11,030,417 B2
(45) Date of Patent: *Jun. 8, 2021

(54) SYSTEMS AND METHODS FOR GENERATING A PLAIN ENGLISH INTERPRETATION OF A LEGAL CLAUSE

(71) Applicant: Capital One Services, LLC, McLean, VA (US)

(72) Inventors: Austin Walters, Savoy, IL (US); Jeremy Edward Goodsitt, Champaign, IL (US); Fardin Abdi Taghi Abad, Seattle, WA (US); Reza Farivar, Champaign, IL (US); Vincent Pham, Champaign, VA (US); Mark Watson, Urbana, IL (US); Kenneth Taylor, Champaign, IL (US); Anh Truong, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,105

(22) Filed: Mar. 10, 2020

(65) Prior Publication Data
US 2020/0210650 A1 Jul. 2, 2020

Related U.S. Application Data

(63) Continuation of application No. 16/515,650, filed on Jul. 18, 2019, now Pat. No. 10,628,530, which is a (Continued)

(51) Int. Cl.
*G06F 40/30* (2020.01)
*G06F 40/35* (2020.01)
(Continued)

(52) U.S. Cl.
CPC .............. *G06F 40/35* (2020.01); *G06F 40/45* (2020.01); *G06K 9/6263* (2013.01); *G06N 3/08* (2013.01); *G06Q 50/18* (2013.01); *H04L 51/046* (2013.01)

(58) Field of Classification Search
CPC ....................................................... G06F 40/45
See application file for complete search history.

(56) References Cited

U.S. PATENT DOCUMENTS 9,754,206 B1 9/2017 Brestoff
10,628,530 B1 * 4/2020 Walters ................... G06F 40/45
(Continued)

OTHER PUBLICATIONS

Jaques, N.—Tuning Recurrent Neural Networks with Reinforcement Learning; Nov. 9, 2016; https://magenta.tensorflow.org/2016/11/09/tuning-recurrent-networks-with-reinforcement-learning.
(Continued)

*Primary Examiner* — Shreyans A Patel
(74) *Attorney, Agent, or Firm* — Troutman Pepper Hamilton Sanders LLP; Christopher J. Forstner; John A. Morrissett

(57) ABSTRACT

A system is configured to perform one or more steps of a method. The system may receive a plurality of attorney communications, identify one or more legal clause interpretations in them, receive a first legal clause and provide it to a trained NN and a probability model. The system may also generate a corresponding first plain English interpretation based on the first legal clause, provide the first plain English interpretation to the probability model, which generates a probability score based on a degree to which the legal clause matches the plain English interpretation in meaning, and determine whether the probability score exceeds a predetermined threshold. Further, the system may instruct the NN to generate a second plain English interpretation based on the first legal clause when the probability score does not exceed
(Continued)

the predetermined threshold, and output the first plain English interpretation when the probability score exceeds the predetermined threshold.

20 Claims, 8 Drawing Sheets

Related U.S. Application Data continuation of application No. 16/273,964, filed on Feb. 12, 2019, now Pat. No. 10,452,784.

(60) Provisional application No. 62/776,941, filed on Dec. 7, 2018.

(51) Int. Cl.
| | | |
|---|---|---|
| *G06Q 50/18* | (2012.01) | |
| *G06K 9/62* | (2006.01) | |
| *G06N 3/08* | (2006.01) | |
| *H04L 12/58* | (2006.01) | |
| *G06F 40/45* | (2020.01) | |

(56) References Cited

U.S. PATENT DOCUMENTS

| | | | |
|---|---|---|---|
| 2011/0046944 A1 | 2/2011 | Sparks | |
| 2014/0025608 A1 | 1/2014 | Miller et al. | |
| 2014/0229158 A1 | 8/2014 | Zweig et al. | |
| 2017/0200076 A1 | 7/2017 | Vinyals et al. | |
| 2018/0144188 A1* | 5/2018 | Evanitsky | G06F 40/242 |
| 2018/0239507 A1* | 8/2018 | Bui | G06F 16/345 |
| 2020/0210650 A1* | 7/2020 | Walters | G06K 9/00463 |

OTHER PUBLICATIONS

Drissi, Y. et al.—PatentAI: IP Infringement Detection with Enhanced Paraphrase Identification; Dec. 5, 2018; https://neurips.cc/Conferences/2018/Schedule?showEvent=12177.

Auli, M., et al.—A novel approach to neural machine translation; May 9, 2017; https://code.fb.com/ml-applications/a-novel-approach-to-neural-machine-translation/.

Shankar, T., et al.—Reinforcement Learning via Recurrent Convolutional Neural Networks; Jan. 9, 2017; https://arxiv.org/abs/1701.02392.

Wikipedia, Garbled Circuit, https://en.wikipedia.org/wiki/Garbled_circuit (as of Apr. 18, 2019).

Wikipedia, Secure Multi-party Computation, https://en.wikipedia.org/wiki/Secure_multi-party_computation (as of Nov. 18, 2018).

Yehuda Lindell, Bar-Ilan University Winter School on Secure Computation and Efficiency, Session 2: The Yao Construction and its Proof Of Security (2011), https://www.youtube.com/watch?v=mtKCDJe4a48 (last visited Dec. 18, 2018).

Mike Rosulek, Oregon State University, Securing Computation: A Brief History of Practical Garbled Circuit Optimizations (2015), https://www.youtube.com/watch?v=FTxh908u9y8 (last visited Dec. 18, 2018).

Kudo, T., et al.—Japanese Dependency Analysis using Cascaded Chunking, proceedings of the 6th conference on Natural language learning Aug. 31, 2002; http://www.aclweb.org/anthology/W02-2016.

Ward M. D., Markov Models for Text Analysis, Labs for 2011 Summer School, http://www.stat.purdue.edu/~mdw/CSOI/MarkovLab.html (Summer 2011).

\* cited by examiner

SYSTEMS AND METHODS FOR GENERATING A PLAIN ENGLISH INTERPRETATION OF A LEGAL CLAUSE

CROSS-REFERENCE TO RELATED APPLICATION

This application is a continuation of, and claims priority under 35 U.S.C. § 120 to, U.S. application Ser. No. 16/515,650, filed Jul. 18, 2019, which is a continuation of U.S. patent application Ser. No. 16/273,964, filed Feb. 12, 2019, now U.S. Pat. No. 10,452,784, which claims the benefit of U.S. Provisional Application No. 62/776,941 filed Dec. 7, 2018, the entire contents and substance of which are hereby incorporated by reference.

FIELD OF INVENTION

The present disclosure relates to systems and methods for generating a plain English interpretation of a legal clause, and more particularly to systems and methods using a neural network (NN) to generate a plain English interpretation of a legal clause.

BACKGROUND

Legal documents tend to be difficult to read and understand, often due to the presence archaic "legalese" jargon or terms. As a result, it can be hard for involved parties to understand the implications of various terms or clauses included in their documents or agreements. Further, even lawyers who draft such legal documents may have difficulties in understanding and/or forecasting the future effects of such clauses. This analysis is even further complicated by the fact that legal specific terms or clauses could have different implications depending on the location (e.g., jurisdiction) in which they are used. Even for those who can understand complex legal documents, analyzing the documents can take considerable time and, in turn, expense.

Accordingly, there is a need for systems and methods for providing a concise plain English version of a legal clause of a legal document. Embodiments of the present disclosure are directed to this and other considerations.

SUMMARY

Disclosed embodiments provide systems and methods using a NN for generating a plain English interpretation of a legal clause.

Consistent with the disclosed embodiments, various methods and systems are disclosed. In an embodiment, a method for generating a plain English interpretation of a legal clause is disclosed. The method may be implemented with a computing device. The method may include receiving a plurality of attorney communications. The method may also include identifying one or more legal clause interpretations in the plurality of attorney communications. The method may also include training a neural network (NN) based on the identified one or more legal clause interpretations. The method may include receiving a first legal clause. The method may include providing the legal clause to the trained N and a probability model. The method may include generating, via the trained NN, a corresponding first plain English interpretation based on the first legal clause. The method may include providing the first plain English interpretation to a probability model, which generates a probability score based on a degree to which the legal clause matches the plain English interpretation in meaning. The method also includes determining whether the probability score exceeds a predetermined threshold. The method also includes instructing the NN to generate a second plain English interpretation based on the first legal clause when the probability score does not exceed the predetermined threshold. Finally, the method includes outputting the first plain English interpretation when the probability score exceeds the predetermined threshold.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
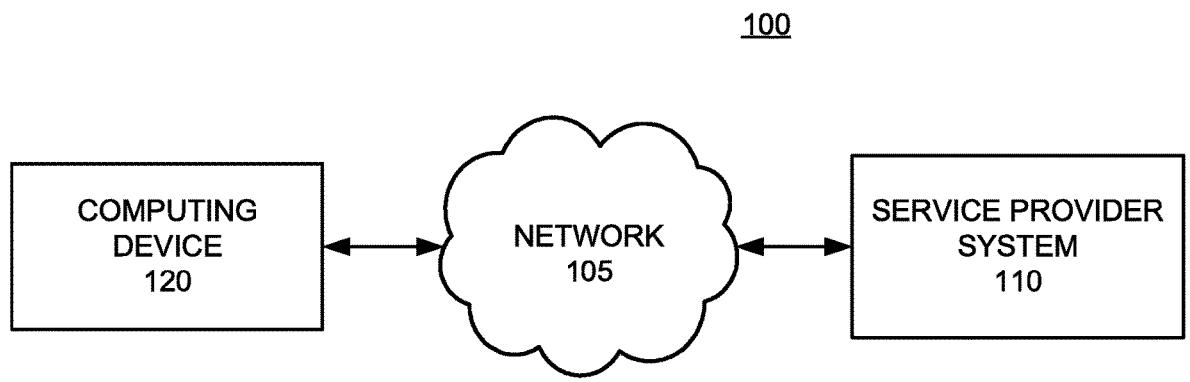
FIG. 1 is a diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, the term "legalese" refers to the specialized language of the legal profession. The goal of this disclosure is to generate accurate plain English interpretations of legal clauses.

This disclosure discusses using a neural network (NN) to translate from a legalese to plain English. It is envisioned that the NN could be a recurrent neural network (RNN), a convolutional neural network (CNN), or a recurrent convolutional neural network (RCNN).

The RNN takes in characters, words, or sentences one at a time. Each of the characters, words, or sentences are fed into the RNN one after another. The RNN has cells (e.g., long short-term memory units) that have can remember prior characters, words, or sentences. In contrast, a CNN takes in all characters, words, or sentences at once making CNNs faster at computing than RNNs. Thus, CNN may be better at translating a paragraph to a sentence. However, the CNN cannot remember what happened before the paragraph since it takes all of the characters, words, or sentences in at once. The RCNN is some combination of a RNN and a CNN. Typically, the RNN will accept the output of the CNN in the RCNN.

The present disclosure relates to methods and systems for using a neural network, and, in particular, for utilizing the NN to generate a plain English interpretation of a legal clause. In some embodiments, a method may include receiving a plurality of attorney communications. The method may also include identifying one or more legal clause interpretations in the plurality of attorney communications. The method may also include training a neural network (NN) based on the identified one or more legal clause interpretations. The method may include receiving a first legal clause. The method may include providing the legal clause to the trained N and a probability model. The method may include generating, via the trained NN, a corresponding first plain English interpretation based on the first legal clause. The method may include providing the first plain English interpretation to a probability model, which generates a probability score based on a degree to which the legal clause matches the plain English interpretation in meaning. The method also includes determining whether the probability score exceeds a predetermined threshold. The method also includes instructing the NN to generate a second plain English interpretation based on the first legal clause when the probability score does not exceed the predetermined threshold. Finally, the method includes outputting the first plain English interpretation when the probability score exceeds the predetermined threshold.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a service provider system 110 in communication with a computing device 120 via network 105. In some embodiments, service provider system 110 may also be in communication with various databases. Computing device 120 may be a mobile computing device (e.g., a smart phone, tablet computer, smart wearable device, portable laptop computer, voice command device, wearable augmented reality device, or other mobile computing device) or a stationary device (e.g., desktop computer).

In some embodiments, the computing device 120 may transmit a legal clause of a legal document (or an entire legal document) to the service provider system 110, and the service provider system 110 may utilize a NN to translate the legal clause or legal document into plain English. In some embodiments, the server provider terminal 110 may control the computing device 120 to implement one or more aspects of the NN. In some cases, the computing device 120 may perform pre-processing on the legal clause (or legal document) before sending pre-processed legal clause (or legal document) to the service provider system 110. For example, the computing device 120 may perform an optical character recognition scan on a legal document containing one or more legal clauses. A user, using the computing device 120, may select a legal clause from the legal document for translation into plain English. As another example, the computing device 120 may normalize a legal clause by e.g., converting numbers to words.

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
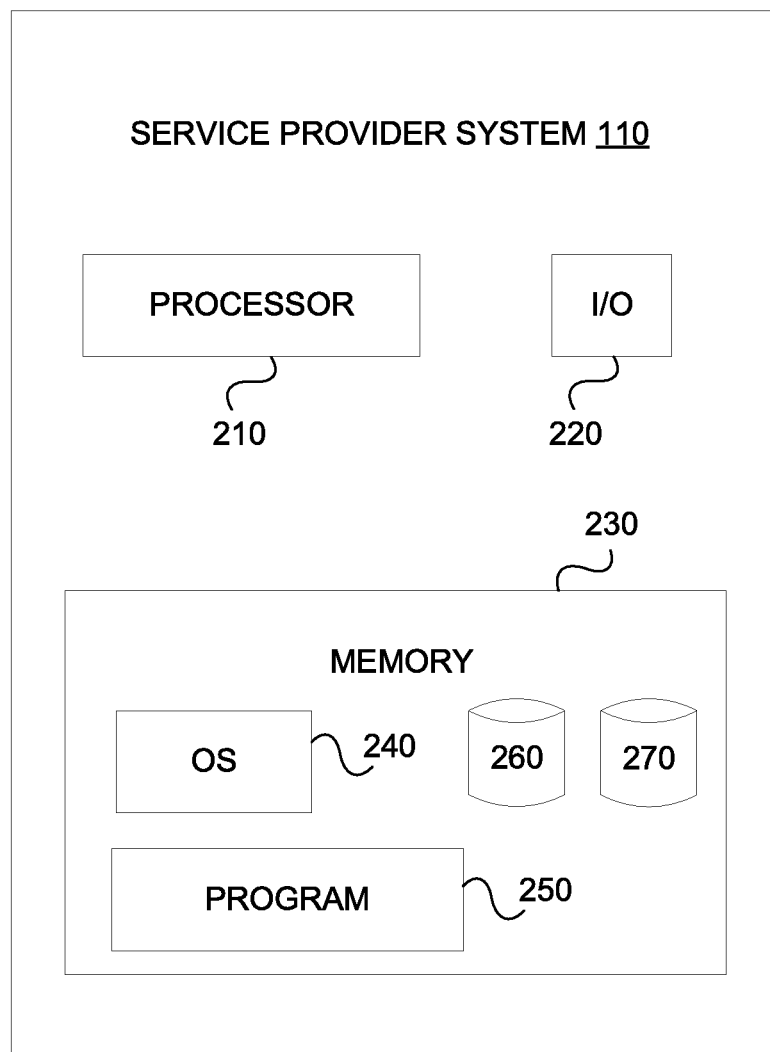
FIG. 2 is a component diagram of a service provider terminal according to an example embodiment.

An example embodiment of service provider system 110 is shown in more detail in FIG. 2. Computing device 120 may have a similar structure and components that are similar to those described with respect to service provider system 110. As shown, service provider system 110 may include a processor 210, an input/output ("I/O") device 220, a memory 230 containing an operating system ("OS") 240 and a program 250. For example, service provider system 110 may be a single server or may be configured as a distributed computer system including multiple servers or computers that interoperate to perform one or more of the processes and functionalities associated with the disclosed embodiments. In some embodiments, service provider system 110 may further include a peripheral interface, a transceiver, a mobile network interface in communication with processor 210, a bus configured to facilitate communication between the various components of the service provider system 110, and a power source configured to power one or more components of service provider system 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider system 110 may configured to remotely communicate with one or more other devices, such as computer device 120. According to some embodiments, service provider system 110 may utilize a NN to translate one or more legal clauses from legalese to plain English.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 110 may include one or more storage devices configured to store information used by processor 210 (or other components) to perform certain functions related to the disclosed embodiments. In one example, service provider system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider system 110 may include memory 230 that may include one or more programs 250 to perform one or more functions of the disclosed embodiments. Moreover, processor 210 may execute one or more programs 250 located remotely from service provider system 110. For example, service provider system 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider system 110 to perform one or more of the processes and functionalities associated with the disclosed embodiments.

Service provider system 110 may also be communicatively connected to one or more memory devices (e.g., databases (not shown)) locally or through a network. The remote memory devices may be configured to store information and may be accessed and/or managed by service provider system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 110 may also include one or more I/O devices 220 that may include one or more interfaces for receiving signals or input from devices and providing signals or output to one or more devices that allow data to be received and/or transmitted by service provider system 110. For example, service provider system 110 may include interface components, which may provide interfaces to one or more input devices, such as one or more keyboards, mouse devices, touch screens, track pads, trackballs, scroll wheels, digital cameras, microphones, sensors, and the like, that enable service provider system 110 to receive data from one or more users (such as via computing device 120).

In example embodiments of the disclosed technology, service provider system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
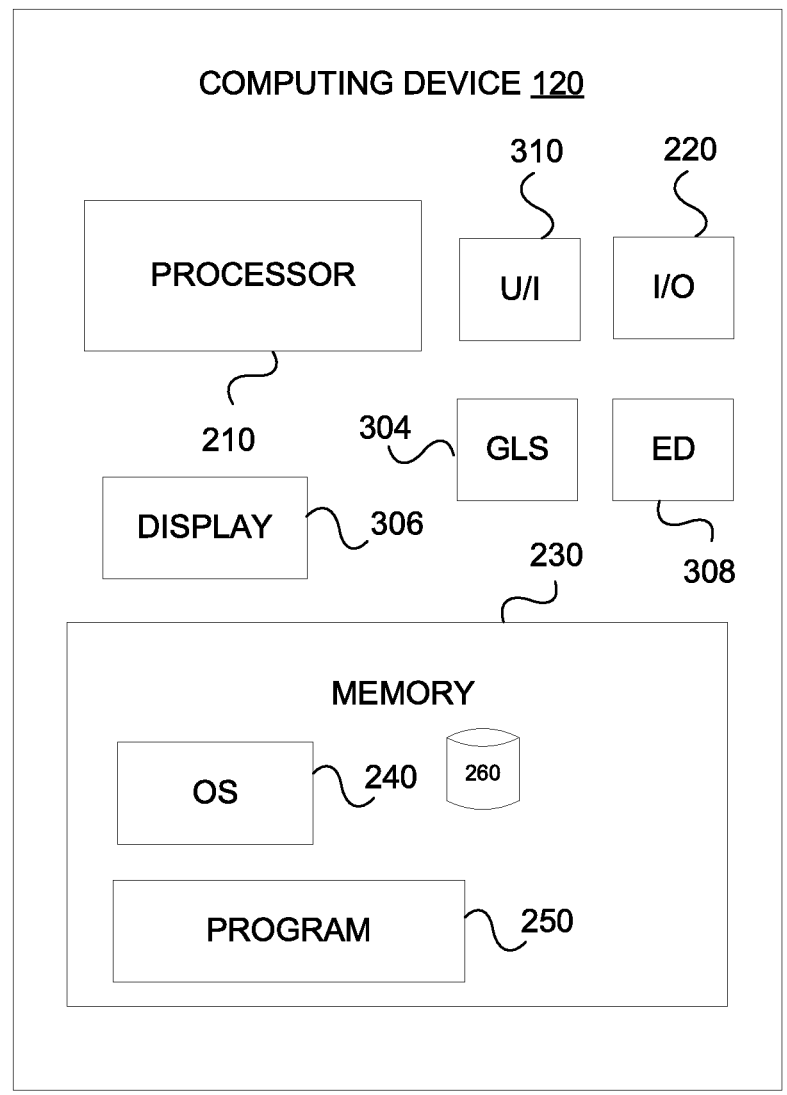
FIG. 3 is a component diagram of a computing device according to an example embodiment.

FIG. 3 shows an example embodiment of computing device 120. As shown, computing device 120 may include input/output ("I/O") device 220 for receiving data from another device (e.g., service provider system 110), memory 230 containing operating system ("OS") 240, program 250, and any other associated component as described above with respect to service provider system 110. Computing device 120 may also have one or more processors 210, a geographic location sensor ("GLS") 304 for determining the geographic location of computing device 120, a display 306 for displaying content such as text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Figure 4A:
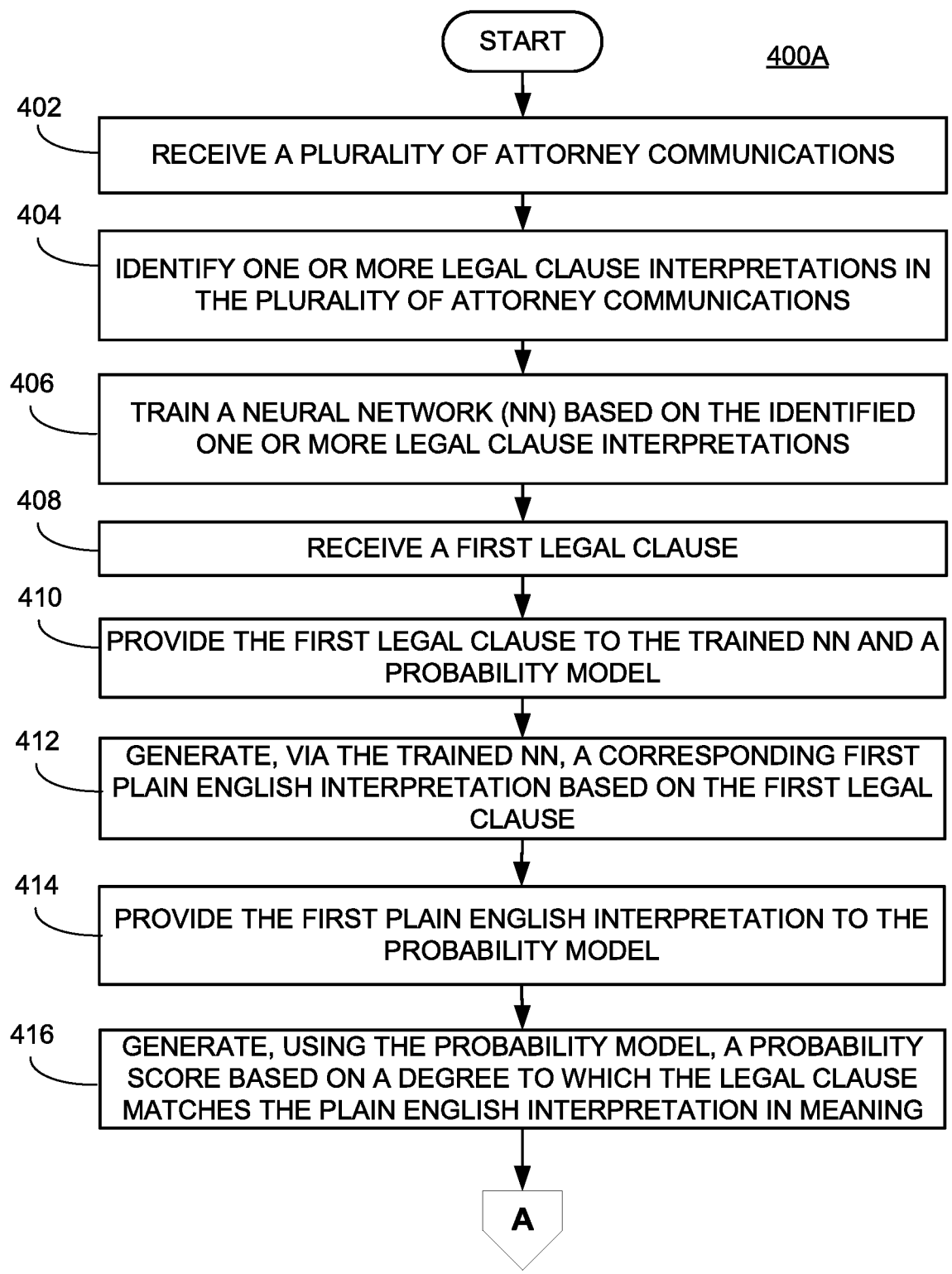
FIG. 4A and FIG. 4B are flowcharts of a method for training a neural network to generate a plain English interpretation of a legal clause and generating a plain English interpretation of a legal clause according to an example embodiment.
Figure 4B:
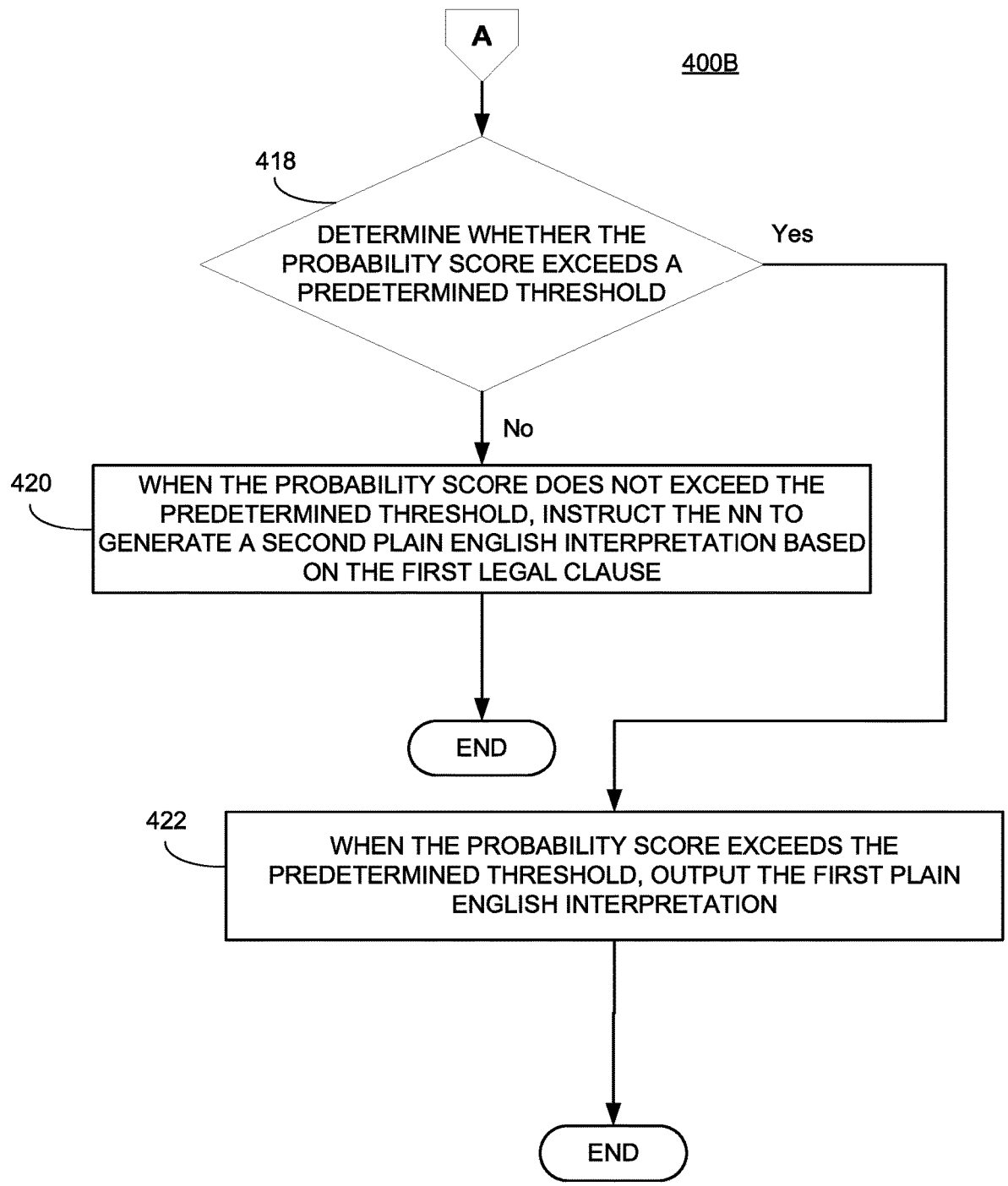

FIG. 4A and FIG. 4B are flowcharts of a method 400A and 400B, respectively, for training a neural network to generate a plain English interpretation of a legal clause and generating a plain English interpretation of the legal clause. Methods 400A and 400B may be performed by one or more of the service provider system 110 and the computing device 120 of the system 100.

In block 402, the system may receive a plurality of attorney communications. The plurality of attorney communications may be emails between the attorney and a client. The emails may include attachments of legal documents such as a nondisclosure agreement, a draft patent application, an assignment, an employment agreement, etc.

In block 404, the system may identify one or more legal clause interpretations in the plurality of attorney communications. As discussed above, the plurality of attorney communications may be email communications. The system may detect a redline change (i.e., a correction or modification to document typically with insertions being underlined and deletions being strikethrough) in a document attached to one of the plurality of email communications. The redline change contains an edit to a legal document that may change a legal clause's meaning. For example, when an attorney removes text in a clause, the revised text (i.e., the original text minus the removed text) is a generation of a plain English interpretation of the legal clause, which the system may identify the paragraph associated with the redline change as a legal clause interpretation. The system may detect an addition in a document attached to one of the plurality of email communications. The system may identify a paragraph associated with the addition as a plain English interpretation of the original paragraph. The system may detect a comment in a document attached to one of the plurality of email communications and identify text within the comment as a legal clause interpretation of the associated paragraph.

In block 406, the system may train a NN based on the identified one or more legal clause interpretations. For example, the system may feed the identified one or more legal clause interpretations along with the original text of the legal clause to the NN. As discussed previously the neural network may be a RNN, a CNN, or a RCNN.

In block 408, the system may receive a legal clause. According to some embodiments, the service provider system 110 receives one or more legal clauses or an entire legal document. In other embodiments, the legal clause is received and then recognized as a legal clause suitable for translation rather than a non-legal clause (e.g., a clause from a technical report). In some embodiments, the method may include receiving a document rather than receiving a legal clause. The method may further include the step of identifying a legal clause in the received document. The step of identifying may be performed by a RNN using long short-term memory (LSTM) units or a CNN.

In block 410, the system may provide the legal clause to the trained NN and a probability model.

In block 412, the system may generate, via the trained NN a corresponding first plain English interpretation based on the first legal clause. In some cases, the service provider system 110 performs the translation. In other cases, the computing device 120 performs translation.

In block 414, the system may provide the first plain English interpretation to the probability model.

In block 416, the system may generate, using the probability model a probability score based on a degree to which the legal clause matches the plain English interpretation in meaning. The score may be any number from 0 to 100, with 100 being a complete match in meaning and 0 being no match in meaning.

In block 418, the system may determine whether the probability score exceeds a predetermined threshold. For example, the system may have a predetermined threshold score of 70. If the system determines that the probability score does not exceed the predetermined threshold (i.e., determination block 418=No), then in block 420, the system may instruct the NN to generate a second plain English interpretation based on the first legal clause. If the system determines that the probability score exceeds the predetermined threshold (i.e., determination block 418=Yes), then in block 422, the system may output the first plain English interpretation. For example, the service provider system 110 may email the user with a translated version of the legal clause. As another example, the service provider system 110 may provide to the user the plain English version of the legal clause via a website by displaying the results of the translation on the website accessible by the computing device 120. As further example, the service provider system 110 may provide the first plain English interpretation in a chat window.

Figure 5:
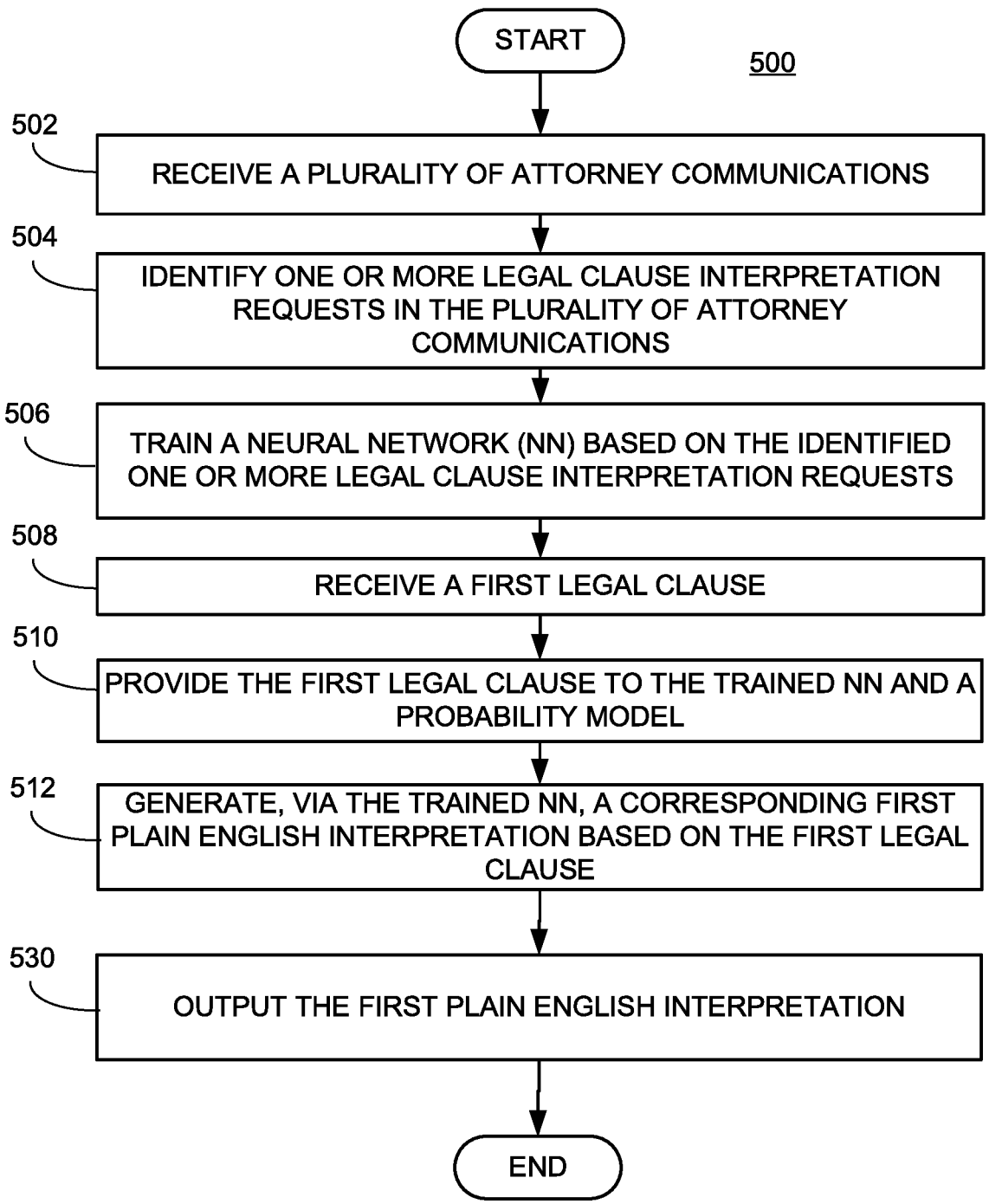
FIG. 5 is a flow chart of a method for training a neural network to generate a plain English interpretation of a legal claims and generating a plain English interpretation of a legal clause according to an example embodiment.

FIG. 5 is a flowchart of a method 500 for training a neural network to generate a plain English interpretation of a legal clause and generating a plain English interpretation of the legal clause. Method 500 may be performed by one or more of the service provider system 110 and the computing device 120 of the system 100.

In method 500, blocks 502, 504, 506, 508, 510, and 512 may be the same as or similar to the steps as blocks 402, 404, 406, 408, 410, and 412, respectively, thus their descriptions will not be repeated for brevity. In block 530, the system may output the first plain English interpretation. For example, the service provider system 110 may email the user with a translated version of the legal clause. As another example, the service provider system 110 may provide to the user the plain English version of the legal clause via a website by displaying the results of the translation on the website accessible by the computing device 120. As further example, the service provider system 110 may provide the first plain English interpretation in a chat window.

Figure 6A:
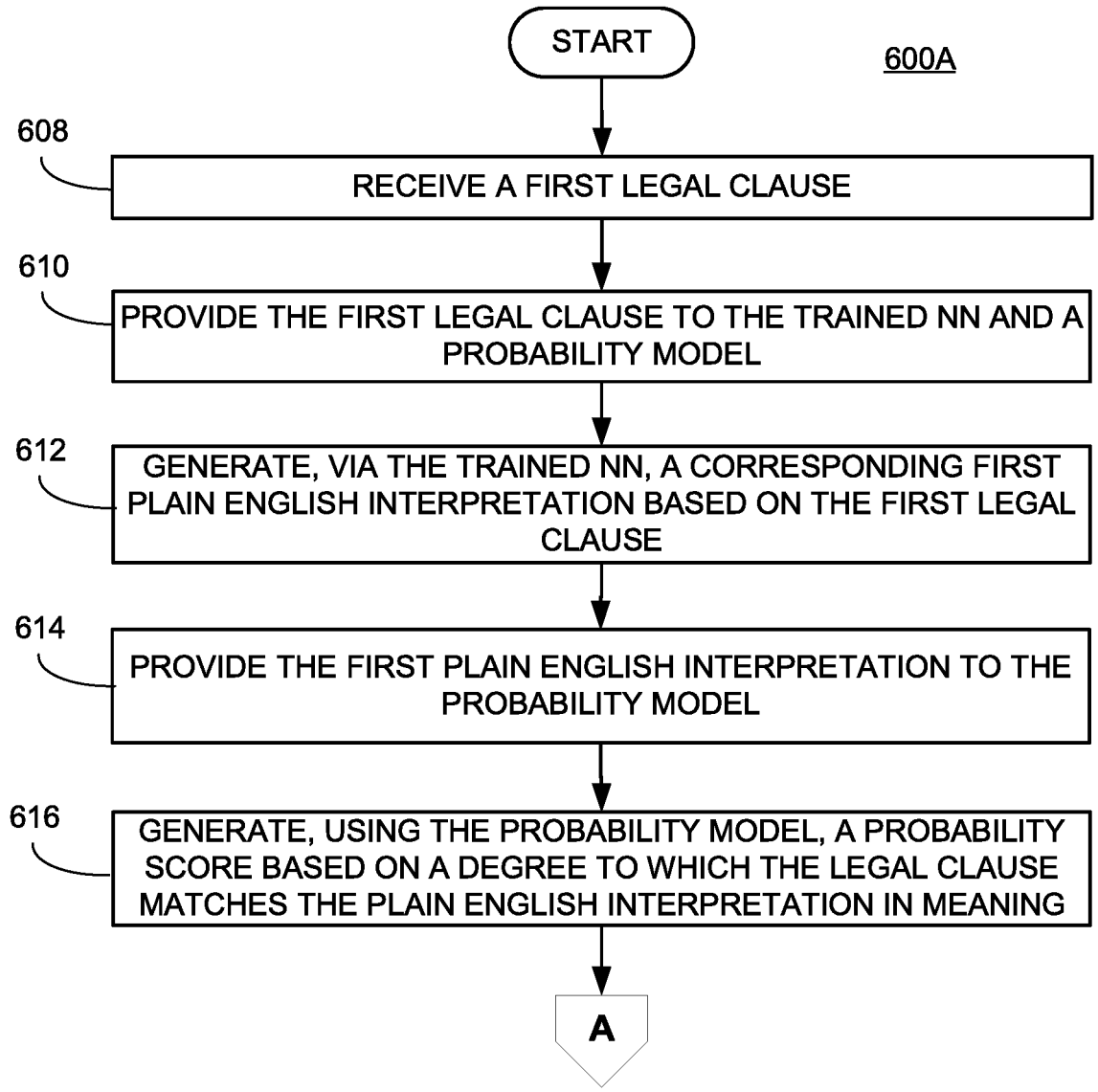
FIG. 6A and FIG. 6B are flowcharts of a method for generating a plain English interpretation of a legal clause according to an example embodiment.
Figure 6B:
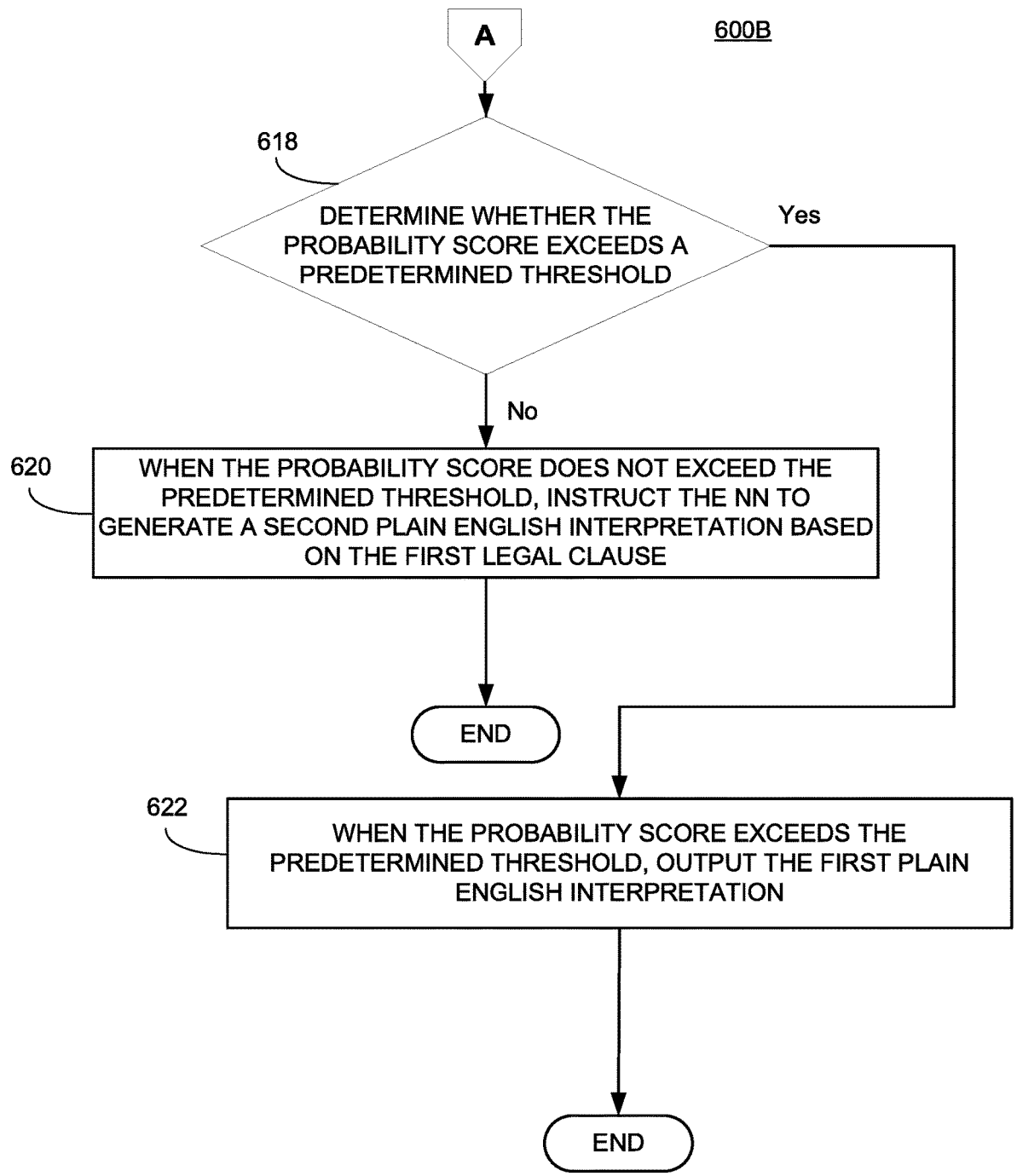

FIG. 6A and FIG. 6B are flowcharts of a method 600A and 600B, respectively, for generating a plain English interpretation of the legal clause. Methods 600A and 600B may be performed by one or more of the service provider system 110 and the computing device 120 of the system 100.

In method 600A, blocks 608, 610, 612, 614, and 616 may be the same as or similar to blocks 408, 410, 412, 414, and 416, respectively, thus their descriptions will not be repeated for brevity. In method 600B, blocks 618, 620, and 622 are the same steps as blocks 418, 420, and 422, thus their descriptions will not be repeated for brevity.

Certain implementations provide the advantage of translating a legal clause from legalese to plain English. Thus, making legal clauses and legal documents more understandable.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description.

References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical use of training a NN generating a plain English interpretation based on a legal clause. It is intended solely for explanatory purposes and not in limitation. In one example, a service provider system 110 receives a plurality of attorney emails. The service provider system 110 identifies one or more legal clause interpretations in the plurality of attorney communications detecting a comment in a document attached to one of the attorney emails and identifying the text within the comment as a legal clause interpretation. The service provider system 110 then trains a RNN based on the identified one or more legal interpretations. The service provider system 110 receives a legal clause, such as a non-compete clause from an employment contract. The service provider system 110 provides the legal clause to the trained RNN and a probability model. The service provider system 110 generates, via the trained NN, a corresponding first plain English interpretation based on the legal clause. The service provider system 110 provides the first plain English interpretation to the probability module. The service provider system 110 generates, using the probability model, a probability score based on a degree to which the legal clause matches the plain English interpretation in meaning. The service provider system 110 determines whether the probability score exceeds a predetermined threshold. For example, the service provider system 110 have a predetermined threshold of 70. The service provider system 110 may instruct the RNN to generate a second plain English interpretation based on the first legal clause when the probability score does not exceed the predetermined threshold. For example, the services provider system 110 may determine that the plain English interpretation of non-compete clause with a score of 60 does not exceed the predetermined threshold of 70, thus, the service provider system 110 may provide the same legal clause back the RNN for processing. The service provider system 110 may output the plain English translation to the user via a website display, email, or a chat window when the service provider system 110 determines that the probability score exceed the predetermined threshold.

What is claimed is:

1. A system, comprising:
one or more processors; and
a memory in communication with the one or more processors and storing instructions that, when executed by the one or more processors, are configured to cause the system to:
identify one or more legal clause interpretations;
train a neural network (NN) based on the identified one or more legal clause interpretations;
generate, via the trained NN, a first interpretation based on a first legal clause;
generate, using a probability model, a probability score based on a degree to which the first legal clause matches the first interpretation in meaning;
determine whether the probability score exceeds a predetermined threshold;
when the probability score does not exceed the predetermined threshold, instruct the NN to generate a second interpretation based on the first legal clause; and
when the probability score exceeds the predetermined threshold, output the first interpretation.

2. The system of claim 1, wherein the probability model is a convolutional neural network (CNN) and the NN is either a CNN or a recurrent neural network (RNN).

3. The system of claim 2, wherein the one or more legal clause interpretations are identified in a plurality of attorney communications, and wherein the plurality of attorney communications comprises a plurality of email communications.

4. The system of claim 3, wherein identifying the one or more legal clause interpretations in the plurality of attorney communications comprises detecting a redline change in a document attached to one of the plurality of email communications and identifying a paragraph associated with the redline change as a first legal clause interpretation of the one or more legal clause interpretations.

5. The system of claim 3, wherein identifying the one or more legal clause interpretations in the plurality of attorney communications comprises detecting an addition in a document attached to one of the plurality of email communications and identifying a paragraph associated with the addition as a first legal clause interpretation of the one or more legal clause interpretations.

6. The system of claim 3, wherein identifying the one or more legal clause interpretations in the plurality of attorney communications comprises detecting a comment in a document attached to one of the plurality of email communications and identifying text within the comment as a first legal clause interpretation of the one or more legal clause interpretations.

7. The system of claim 1, wherein the instructions, when executed by the one or more processors, are further configured to cause the system to:
   receive, from a user device, reinforcement feedback based on the first interpretation; and
   iteratively re-train the trained NN based on the received reinforcement feedback.

8. The system of claim 6, wherein the output of the first interpretation is in a chat program accessible by the user device and a reinforcement feedback is provided from the user device via the chat program.

9. A system, comprising:
   one or more processors; and
   a memory in communication with the one or more processors and storing instructions that, when executed by the one or more processors, are configured to cause the system to:
      generate, via a trained neural network (NN), a first interpretation based on a first legal clause;
      receive reinforcement feedback based on the first interpretation; and
      iteratively re-train the trained NN based on the received reinforcement feedback.

10. The system of claim 9, wherein the NN is either a convolutional neural network (CNN) or a recurrent neural network (RNN).

11. The system of claim 10, wherein the plurality of attorney communications comprises a plurality of email communications, and the instructions, when executed by the one or more processors, are further configured to cause the system to:
   identify one or more legal clause interpretations in a plurality of attorney communications; and
   train the NN based on the identified one or more legal clause interpretations to form the trained NN.

12. The system of claim 11, wherein identifying the one or more legal clause interpretations in the plurality of attorney communications comprises detecting a redline change in a document attached to one of the plurality of email communications and identifying a paragraph associated with the redline change as a first legal clause interpretation of the one or more legal clause interpretations.

13. The system of claim 11, wherein identifying the one or more legal clause interpretation request in the plurality of attorney communications comprises detecting an addition in a document attached to one of the plurality of email communications and identifying a paragraph associated with the addition as a first legal clause interpretation of the one or more legal clause interpretations.

14. The system of claim 11, wherein identifying the one or more legal clause interpretation request in the plurality of attorney communications comprises detecting a comment in a document attached to one of the plurality of email communications and identifying text within the comment as a first legal clause interpretation of the one or more legal clause interpretations.

15. The system of claim 9, wherein the output of the first non-legalese interpretation is in a chat program accessible by a user device and the reinforcement feedback is provided from the user device via the chat program.

16. A system, comprising:
   one or more processors; and
   a memory in communication with the one or more processors and storing instructions that, when executed by the one or more processors, are configured to cause the system to:
      generate, via a trained neural network (NN), a first interpretation based on a first legal clause;
      generate, using a probability model, a probability score based on a degree to which the first legal clause matches the non-legalese interpretation in meaning;
      determine whether the probability score exceeds a predetermined threshold;
      when the probability score does not exceed the predetermined threshold, instruct the NN to generate a second interpretation based on the first legal clause; and
      when the probability score exceeds the predetermined threshold, output the first interpretation.

17. The system of claim 16, wherein the probability model is a convolutional neural network (CNN) and the neural network is at either a CNN or a recurrent neural network (RNN).

18. The system of claim 16, wherein the instructions, when executed by the one or more processors, are further configured to cause the system to:
   receive reinforcement feedback based on the first interpretation; and
   iteratively re-train the trained NN based on the received reinforcement feedback.

19. The system of claim 18, wherein the output of the first interpretation is in a chat program accessible by the user device and the reinforcement feedback is provided from the user device via the chat program.

20. The system of claim 16, wherein the first interpretation comprises a first plain English interpretation.

\* \* \* \* \*